(12) United States Patent
Choi

(10) Patent No.: US 10,298,036 B2
(45) Date of Patent: May 21, 2019

(54) CRADLE FOR ELECTRONIC DEVICE

(71) Applicant: Samsung Electronics Co., Ltd., Suwon-si (KR)

(72) Inventor: Bong-Suk Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 289 days.

(21) Appl. No.: 14/835,343

(22) Filed: Aug. 25, 2015

(65) Prior Publication Data
US 2016/0056647 A1 Feb. 25, 2016

(30) Foreign Application Priority Data
Aug. 25, 2014 (KR) .................. 10-2014-0111050

(51) Int. Cl.
*H02J 7/00* (2006.01)
*H01R 13/73* (2006.01)

(52) U.S. Cl.
CPC ............ *H02J 7/0045* (2013.01); *H01R 13/73* (2013.01); *H02J 7/0036* (2013.01); *H02J 7/0047* (2013.01); *H02J 2007/005* (2013.01)

(58) Field of Classification Search
CPC .. H02J 7/0045; H02J 2007/005; H02J 7/0036; H02J 7/0047; H01R 13/73
USPC ......................................................... 320/107
See application file for complete search history.

(56) References Cited

U.S. PATENT DOCUMENTS

| | | | | |
|---|---|---|---|---|
| 5,272,431 A | * | 12/1993 | Nee ...................... | B60L 3/0023 320/109 |
| 5,684,673 A | * | 11/1997 | Shibasaki ............. | G06F 1/1632 361/679.42 |
| 5,751,548 A | * | 5/1998 | Hall ....................... | F16C 11/10 248/122.1 |
| 5,828,966 A | * | 10/1998 | Davis .................... | H02J 7/0042 320/115 |
| 5,859,481 A | * | 1/1999 | Banyas ................. | H02J 7/0024 307/130 |

(Continued)

FOREIGN PATENT DOCUMENTS

| KR | 20000000550 | 1/2000 |
|---|---|---|
| KR | 20020051574 | 6/2002 |

(Continued)

OTHER PUBLICATIONS

"Working Class Heroes Felt Laptop Sleeve," Dee Sandin, TrenderHunter. com, Published Online Apr. 7, 2011, Accessed Online Jul. 17, 2017, https://www.trendhunter.com/trends/working-class-heroes-laptop-sleeves-ipod-pouches.*

*Primary Examiner* — Robert J Grant
*Assistant Examiner* — John T Trischler
(74) *Attorney, Agent, or Firm* — Jefferson IP Law, LLP

(57) ABSTRACT

A cradle for an electronic device includes a mounting portion to detachably/attachably accommodate at least a part of the electronic device, a connector disposed in the mounting portion, and a detection member disposed in the mounting portion to detect whether the electronic device is mounted on the mounting portion. Only when the electronic device is attached to the cradle, the cradle may charge a battery or establish an electrical connection automatically with an external device to transmit/receive data. Therefore, a Product Liability (PL) accident can be prevented, and reliability of the cradle can be improved.

15 Claims, 9 Drawing Sheets

(56) References Cited

U.S. PATENT DOCUMENTS

| | | | | |
|---|---|---|---|---|
| 5,859,762 A * | 1/1999 | Clark | F16M 11/10 | 248/122.1 |
| 6,046,571 A * | 4/2000 | Bovio | G06F 1/1632 | 320/107 |
| 6,157,162 A * | 12/2000 | Hayashi | B60L 11/1818 | 320/104 |
| 6,317,061 B1 * | 11/2001 | Batra | G06F 3/0202 | 341/20 |
| 6,524,240 B1 * | 2/2003 | Thede | A61B 5/021 | 128/897 |
| 6,597,794 B2 * | 7/2003 | Cole | G06F 1/1616 | 381/306 |
| 6,756,764 B2 * | 6/2004 | Smith | F02N 11/14 | 320/105 |
| 6,762,930 B2 * | 7/2004 | Minne' | G06K 19/07 | 361/679.55 |
| 6,937,468 B2 * | 8/2005 | Lin | G06F 1/1632 | 361/679.41 |
| 7,068,508 B2 * | 6/2006 | Patel | G06F 1/203 | 165/104.19 |
| 7,274,931 B2 * | 9/2007 | Harris | H04M 1/04 | 348/14.02 |
| 7,298,611 B1 * | 11/2007 | Carnevali | G06F 1/1632 | 361/679.55 |
| 7,315,453 B1 * | 1/2008 | Carnevali | G06F 1/1632 | 312/223.1 |
| 7,332,889 B2 * | 2/2008 | Glasgow | H02J 7/0045 | 320/107 |
| 7,332,890 B2 * | 2/2008 | Cohen | A47L 9/2857 | 320/109 |
| 7,417,855 B2 * | 8/2008 | Carnevali | G06F 1/1632 | 312/223.1 |
| 7,426,108 B2 * | 9/2008 | Carnevali | G06F 1/16 | 361/679.41 |
| 7,480,139 B2 * | 1/2009 | Ryder | G06F 1/1632 | 320/113 |
| 7,508,661 B2 * | 3/2009 | Carnevali | G06F 1/1632 | 211/41.17 |
| 7,554,285 B2 * | 6/2009 | Simoes | H02J 7/0034 | 320/103 |
| 7,573,706 B2 * | 8/2009 | Carnevali | G06F 1/1632 | 361/679.4 |
| 7,583,495 B2 * | 9/2009 | Carnevali | G06F 1/1632 | 361/679.29 |
| 7,589,500 B2 * | 9/2009 | Johnson | B25F 5/00 | 320/114 |
| 7,633,750 B2 * | 12/2009 | Fan | G06F 1/1632 | 361/679.41 |
| 7,679,317 B2 * | 3/2010 | Veselic | G06F 1/266 | 320/106 |
| 7,793,121 B2 * | 9/2010 | Lawther | H02J 7/025 | 136/243 |
| 7,869,195 B1 * | 1/2011 | Patton | G06F 1/1616 | 361/679.01 |
| 7,884,571 B2 * | 2/2011 | Veselic | G06F 1/266 | 320/106 |
| 7,894,180 B2 * | 2/2011 | Carnevali | G06F 1/1632 | 248/122.1 |
| 8,138,715 B2 * | 3/2012 | Lowenthal | B60L 11/1816 | 320/104 |
| 8,138,718 B2 * | 3/2012 | Dower | B60L 11/1818 | 320/109 |
| 8,154,245 B2 * | 4/2012 | Veselic | G06F 1/266 | 320/106 |
| 8,169,186 B1 * | 5/2012 | Haddad | B60L 11/1835 | 180/14.3 |
| 8,179,672 B2 * | 5/2012 | Carnevali | G06F 1/1632 | 361/679.41 |
| 8,185,681 B2 * | 5/2012 | Downing | G06F 1/1632 | 361/679.41 |
| 8,234,509 B2 * | 7/2012 | Gioscia | G06F 1/1632 | 713/300 |
| 8,278,875 B2 * | 10/2012 | Hagenmaier, Jr. | B60L 11/1824 | 320/109 |
| 8,352,114 B2 * | 1/2013 | More | G05D 1/0225 | 320/109 |
| 8,378,624 B2 * | 2/2013 | Boyles | H02J 7/0027 | 320/106 |
| 8,384,344 B1 * | 2/2013 | Rogers | H02J 7/00 | 180/65.21 |
| 8,390,251 B2 * | 3/2013 | Cohen | A47L 9/2857 | 320/109 |
| 8,414,312 B2 * | 4/2013 | Hung | H01R 13/648 | 439/108 |
| 8,432,131 B2 * | 4/2013 | Lowenthal | B60L 11/1816 | 320/109 |
| 8,436,584 B2 * | 5/2013 | Johnson | B25F 5/00 | 320/114 |
| 8,441,230 B2 * | 5/2013 | Boyles | H02J 7/0013 | 320/107 |
| 8,450,967 B2 * | 5/2013 | Lowenthal | B60L 11/1816 | 320/104 |
| 8,461,803 B2 * | 6/2013 | Cohen | A47L 9/2857 | 320/109 |
| 8,541,975 B2 * | 9/2013 | Park | H02J 7/025 | 320/104 |
| 8,559,171 B2 * | 10/2013 | Cummins | G06F 1/1632 | 361/679.3 |
| 8,583,264 B2 * | 11/2013 | Nielsen | F16L 1/11 | 361/679.01 |
| 8,600,526 B2 * | 12/2013 | Nielsen | F16L 1/11 | 361/679.01 |
| 8,644,965 B2 * | 2/2014 | Nielsen | F16L 1/11 | 361/679.01 |
| 8,688,037 B2 * | 4/2014 | Chatterjee | G06F 1/1632 | 320/107 |
| 8,736,228 B1 * | 5/2014 | Freed | H02J 7/0044 | 320/107 |
| 8,749,196 B2 * | 6/2014 | Cohen | A47L 9/2857 | 320/109 |
| 8,792,221 B2 * | 7/2014 | Ramey | H02J 7/0029 | 361/90 |
| 8,830,073 B2 * | 9/2014 | Sims | G06F 1/3203 | 320/107 |
| 8,841,881 B2 * | 9/2014 | Failing | B60L 3/00 | 307/65 |
| 8,854,001 B2 * | 10/2014 | Cohen | A47L 9/2857 | 320/104 |
| 8,866,436 B2 * | 10/2014 | Lowenthal | G06Q 30/04 | 320/104 |
| 8,868,939 B2 * | 10/2014 | Matsuoka | G06F 1/1632 | 320/107 |
| 8,873,233 B2 * | 10/2014 | Reber | G06F 1/1632 | 361/679.01 |
| 8,910,863 B2 * | 12/2014 | Wojcik | G06K 7/082 | 235/383 |
| 8,913,771 B2 * | 12/2014 | Filson | G06F 1/1656 | 345/169 |
| 8,977,393 B1 * | 3/2015 | Kohler | H02J 7/02 | 320/107 |
| 9,007,015 B1 * | 4/2015 | Nook | H02J 7/0054 | 307/150 |
| 9,030,155 B1 * | 5/2015 | Li | H02J 7/0003 | 320/107 |
| 9,036,343 B2 * | 5/2015 | Carnevali | G06F 1/1632 | 361/679.41 |
| 9,124,112 B2 * | 9/2015 | Havass | H02J 7/0047 | |
| 9,178,374 B2 * | 11/2015 | Wojcik | G06K 7/082 | |
| 9,195,267 B2 * | 11/2015 | Pan | G06F 1/1628 | |
| 9,215,957 B2 * | 12/2015 | Cohen | A47L 9/2857 | |
| 9,264,088 B2 * | 2/2016 | Wojcik | G06K 7/082 | |
| 9,330,520 B2 * | 5/2016 | Phelps | G07F 15/00 | |
| 9,429,994 B1 * | 8/2016 | Vier | G06F 1/1656 | |
| 9,431,835 B2 * | 8/2016 | Lowenthal | G06Q 30/04 | |
| 9,550,294 B2 * | 1/2017 | Cohen | A47L 9/2857 | |
| 9,573,050 B2 * | 2/2017 | Thompson | G07F 17/3211 | |
| 9,578,149 B2 * | 2/2017 | Moon | H04M 1/0202 | |

(56) References Cited

U.S. PATENT DOCUMENTS

| | | | | |
|---|---|---|---|---|
| 9,680,518 B2* | 6/2017 | Wojcik | | H04B 1/3888 |
| 9,721,077 B1* | 8/2017 | Daniel | | G06F 21/31 |
| 9,858,748 B2* | 1/2018 | Thompson | | G07F 17/3211 |
| 2002/0053895 A1* | 5/2002 | Simoes | | H02J 7/0034 |
| | | | | 320/114 |
| 2002/0099891 A1* | 7/2002 | Cole | | G06F 1/1616 |
| | | | | 710/200 |
| 2002/0121877 A1* | 9/2002 | Smith | | F02N 11/14 |
| | | | | 320/103 |
| 2003/0133262 A1* | 7/2003 | Minne' | | G06K 19/07 |
| | | | | 361/679.55 |
| 2005/0046384 A1* | 3/2005 | Simoes | | H02J 7/0034 |
| | | | | 320/114 |
| 2005/0111182 A1* | 5/2005 | Lin | | G06F 1/1632 |
| | | | | 361/679.41 |
| 2005/0122678 A1* | 6/2005 | Patel | | G06F 1/203 |
| | | | | 361/679.53 |
| 2005/0156562 A1* | 7/2005 | Cohen | | A47L 9/2857 |
| | | | | 320/107 |
| 2006/0091858 A1* | 5/2006 | Johnson | | B25F 5/00 |
| | | | | 320/128 |
| 2006/0181241 A1* | 8/2006 | Veselic | | G06F 1/266 |
| | | | | 320/107 |
| 2006/0245131 A1* | 11/2006 | Ramey | | H02J 7/0029 |
| | | | | 361/90 |
| 2007/0114975 A1* | 5/2007 | Cohen | | A47L 9/2857 |
| | | | | 320/149 |
| 2007/0139016 A1* | 6/2007 | Lambert | | H02J 7/0036 |
| | | | | 320/140 |
| 2007/0244471 A1* | 10/2007 | Malackowski | | H01M 10/42 |
| | | | | 606/1 |
| 2007/0267998 A1* | 11/2007 | Cohen | | A47L 9/2857 |
| | | | | 320/109 |
| 2008/0002345 A1* | 1/2008 | Carnevali | | G06F 1/1632 |
| | | | | 361/679.41 |
| 2008/0002351 A1* | 1/2008 | Carnevali | | G06F 1/1632 |
| | | | | 361/679.41 |
| 2008/0002352 A1* | 1/2008 | Carnevali | | G06F 1/16 |
| | | | | 361/679.41 |
| 2008/0002353 A1* | 1/2008 | Carnevali | | G06F 1/1632 |
| | | | | 361/679.41 |
| 2008/0002354 A1* | 1/2008 | Carnevali | | G06F 1/1632 |
| | | | | 361/679.41 |
| 2008/0002355 A1* | 1/2008 | Carnevali | | G06F 1/1632 |
| | | | | 361/679.41 |
| 2008/0002369 A1* | 1/2008 | Carnevali | | G06F 1/1632 |
| | | | | 361/724 |
| 2008/0007203 A1* | 1/2008 | Cohen | | A47L 9/2857 |
| | | | | 320/104 |
| 2008/0019082 A1* | 1/2008 | Krieger | | B60R 11/0241 |
| | | | | 361/601 |
| 2008/0100995 A1* | 5/2008 | Ryder | | G06F 1/1632 |
| | | | | 361/601 |
| 2008/0211458 A1* | 9/2008 | Lawther | | H02J 7/025 |
| | | | | 320/132 |
| 2008/0278894 A1* | 11/2008 | Chen | | G06F 1/1632 |
| | | | | 361/679.01 |
| 2009/0231801 A1* | 9/2009 | Cummins | | G06F 1/1632 |
| | | | | 361/679.41 |
| 2010/0060232 A1* | 3/2010 | Boyles | | H02J 7/0027 |
| | | | | 320/107 |
| 2010/0073862 A1* | 3/2010 | Carnevali | | G06F 1/1632 |
| | | | | 361/679.43 |
| 2010/0084532 A1* | 4/2010 | Nielsen | | F16L 1/11 |
| | | | | 248/346.03 |
| 2010/0085694 A1* | 4/2010 | Nielsen | | F16L 1/11 |
| | | | | 361/679.08 |
| 2010/0085701 A1* | 4/2010 | Nielsen | | F16L 1/11 |
| | | | | 361/679.43 |
| 2010/0127864 A1* | 5/2010 | Veselic | | G06F 1/266 |
| | | | | 340/540 |
| 2010/0228405 A1* | 9/2010 | Morgal | | B62H 3/02 |
| | | | | 701/2 |
| 2011/0121783 A1* | 5/2011 | Boyles | | H02J 7/0013 |
| | | | | 320/113 |
| 2011/0127950 A1* | 6/2011 | Veselic | | G06F 1/266 |
| | | | | 320/107 |
| 2011/0192857 A1* | 8/2011 | Rothbaum | | B25F 1/00 |
| | | | | 220/694 |
| 2011/0258093 A1* | 10/2011 | Antoci | | G06Q 30/02 |
| | | | | 705/34 |
| 2011/0279078 A1* | 11/2011 | Hara | | H02J 7/085 |
| | | | | 320/107 |
| 2011/0295420 A1* | 12/2011 | Wagner | | G05D 1/0225 |
| | | | | 700/245 |
| 2012/0005495 A1* | 1/2012 | Matsuoka | | G06F 1/1632 |
| | | | | 713/300 |
| 2012/0014056 A1* | 1/2012 | Chen | | F16M 11/08 |
| | | | | 361/679.41 |
| 2012/0049798 A1* | 3/2012 | Cohen | | A47L 9/2857 |
| | | | | 320/109 |
| 2012/0071013 A1* | 3/2012 | Hung | | H01R 13/648 |
| | | | | 439/92 |
| 2012/0075793 A1* | 3/2012 | Chien | | G06F 1/1632 |
| | | | | 361/679.41 |
| 2012/0126748 A1* | 5/2012 | Haddad | | B60L 11/1835 |
| | | | | 320/109 |
| 2012/0206099 A1* | 8/2012 | Ichikawa | | B60L 11/1838 |
| | | | | 320/109 |
| 2012/0224321 A1* | 9/2012 | Carnevali | | G06F 1/1632 |
| | | | | 361/679.43 |
| 2012/0249054 A1* | 10/2012 | King | | H02J 7/0003 |
| | | | | 320/107 |
| 2012/0286730 A1* | 11/2012 | Bonny | | B60L 11/1827 |
| | | | | 320/109 |
| 2013/0107445 A1* | 5/2013 | Reber | | H04M 1/04 |
| | | | | 361/679.41 |
| 2013/0111097 A1* | 5/2013 | Pan | | G06F 1/1628 |
| | | | | 710/304 |
| 2013/0187617 A1* | 7/2013 | Tham | | G08B 13/00 |
| | | | | 320/137 |
| 2013/0200841 A1* | 8/2013 | Farkas | | H02J 7/0042 |
| | | | | 320/107 |
| 2013/0265682 A1* | 10/2013 | Ramey | | H02J 7/0029 |
| | | | | 361/79 |
| 2013/0335914 A1* | 12/2013 | Lee | | G06F 1/1632 |
| | | | | 361/679.41 |
| 2014/0035516 A1* | 2/2014 | Fratti | | H02J 7/0013 |
| | | | | 320/108 |
| 2014/0098475 A1* | 4/2014 | Bae | | D03D 25/00 |
| | | | | 361/679.01 |
| 2014/0117921 A1* | 5/2014 | Suomela | | H04B 5/0031 |
| | | | | 320/103 |
| 2014/0253021 A1* | 9/2014 | Luke | | H02J 7/0013 |
| | | | | 320/107 |
| 2014/0253032 A1* | 9/2014 | Bruwer | | H02M 1/36 |
| | | | | 320/108 |
| 2014/0266005 A1* | 9/2014 | Havass | | H02J 7/0047 |
| | | | | 320/106 |
| 2014/0266006 A1* | 9/2014 | Luke | | B60L 11/1825 |
| | | | | 320/106 |
| 2014/0312691 A1* | 10/2014 | Doljack | | H02J 7/0036 |
| | | | | 307/29 |
| 2014/0354214 A1* | 12/2014 | Phelps | | G07F 15/00 |
| | | | | 320/107 |
| 2014/0379129 A1* | 12/2014 | Edsinger | | B25J 9/0009 |
| | | | | 700/254 |
| 2015/0009608 A1* | 1/2015 | Nielsen | | F16L 1/11 |
| | | | | 361/679.01 |
| 2015/0016035 A1* | 1/2015 | Tussy | | G06F 1/1635 |
| | | | | 361/679.03 |
| 2015/0037618 A1* | 2/2015 | Kim | | H01M 2/1022 |
| | | | | 429/7 |
| 2015/0057800 A1* | 2/2015 | Cohen | | A47L 9/2857 |
| | | | | 700/258 |
| 2015/0077926 A1* | 3/2015 | Schneider | | G06F 1/1632 |
| | | | | 361/679.41 |

(56) References Cited

U.S. PATENT DOCUMENTS

| | | | | |
|---|---|---|---|---|
| 2015/0123594 A1* | 5/2015 | Nowak | ........... | H02J 7/0054 |
| | | | | 320/107 |
| 2015/0123598 A1* | 5/2015 | Tew | ........... | H02J 7/0042 |
| | | | | 320/107 |
| 2015/0137734 A1* | 5/2015 | Wojcik | ........... | G06K 7/082 |
| | | | | 320/103 |
| 2015/0205330 A1* | 7/2015 | Zhang | ........... | G06F 1/1626 |
| | | | | 361/679.3 |
| 2015/0280343 A1* | 10/2015 | Hsu | ........... | H01R 13/2421 |
| | | | | 439/607.01 |
| 2015/0329002 A1* | 11/2015 | Broecker | ........... | B60L 11/1846 |
| | | | | 320/109 |
| 2015/0365120 A1* | 12/2015 | Wojcik | ........... | G06K 7/082 |
| | | | | 455/573 |
| 2016/0031338 A1* | 2/2016 | Penilla | ........... | B60L 11/1824 |
| | | | | 320/109 |
| 2016/0075021 A1* | 3/2016 | Cohen | ........... | A47L 9/2857 |
| | | | | 700/253 |
| 2016/0119013 A1* | 4/2016 | Wojcik | ........... | G06K 7/082 |
| | | | | 455/573 |
| 2016/0154431 A1* | 6/2016 | Vroom | ........... | G06F 1/1632 |
| | | | | 361/679.41 |
| 2016/0234362 A1* | 8/2016 | Moon | ........... | H04M 1/0202 |
| 2017/0072564 A1* | 3/2017 | Cohen | ........... | A47L 9/2857 |
| 2017/0106762 A1* | 4/2017 | Dow | ........... | B60L 11/1835 |
| 2017/0149940 A1* | 5/2017 | Moon | ........... | H04M 1/0268 |
| 2017/0346320 A1* | 11/2017 | Jeong | ........... | H02J 7/0027 |

FOREIGN PATENT DOCUMENTS

| | | |
|---|---|---|
| KR | 200303580 | 1/2003 |
| KR | 20040077328 | 9/2004 |
| KR | 20080020160 | 3/2008 |

* cited by examiner

CRADLE FOR ELECTRONIC DEVICE

PRIORITY

This application claims the benefit under 35 U.S.C. § 119(a) of a Korean patent application filed in the Korean Intellectual Property Office on Aug. 25, 2014 and assigned Serial No. 10-2014-0111050, the entire disclosure of which is hereby incorporated by reference.

BACKGROUND

1. Field of the Disclosure

Various exemplary embodiments of the present disclosure relate to a cradle, and for example, a cradle for an electronic device.

2. Description of the Related Art

Electronic devices have become more everyday consumer friendly. In particular, among the consumer friendly electronic devices, portable electronic devices have become essential necessity of everyday lives.

Since the electronic devices are launched in various sizes according to functionalities and user preferences, appearances of the electronic devices have also become an important factor in addition to sizes and functionalities of the devices. Typical users generally favor one electronic device that have elegant designs over other electronic devices even if the other electronic devices may have similar functionalities as the one electronic device.

According to an exemplary embodiment, manufacturers of electronic devices typically also provide cradles to charge power sources (e.g., a battery pack) equipped in the electronic devices and to transmit/receive data with respect to an external device (e.g., a Personal Computer (PC), etc.). Therefore, convenience of use also needs to be improved for the cradle.

SUMMARY

According to various exemplary embodiments, in case of a wearable electronic device which has recently been launched, a size thereof is relatively small and thus it is a great burden to provide a space for mounting an additional connector port (e.g., a 5-pin micro Universal Serial Bus (USB) connector port, and the like) for charging and/or data transmission/reception. To solve this problem, only a plurality of terminals that can be exposed to properly position the electronic device may be included in an electronic device. Accordingly, the charging cradle may require a connector pin to easily connect to the exposed terminals of the electronic device. A pogo pin may be used as the connecter pin.

According to an exemplary embodiment, the pogo pin is disposed in a position corresponding to the exposed terminals of the electronic devices in a protrusion manner on a surface on which the electronic device of the cradle is attached. The exposed terminals of the electronic device physically contact the pogo pins when the electronic device is docked in the cradle, thus enabling any desired charging and/or data transmission/reception.

According to various exemplary embodiments, there may be provided a cradle for an electronic device. The cradle may be electrically connected to an external power source without a manual switching operation, or implemented to allow an electrical connection only in a state of being physically connected to the electronic device.

According to various exemplary embodiments, a cradle for an electronic device is provided. The cradle may include a mounting portion to attachably/detachably accommodate at least a part of the electronic device, a connector disposed in the mounting portion, and a detection member disposed in the mounting portion to detect whether the electronic device is mounted on the mounting portion.

According to various exemplary embodiments, a cradle for an electronic device is provided. The cradle may include a mounting portion to attachably/detachably accommodate at least a part of the electronic device, a connector disposed to protrude upwardly in the mounting portion, a detection button to establish an electrical connection between the connector and a power source by an operation of pulling back by the electronic device mounted on the mounting portion, a pair of hooking pieces extending upwardly at positions facing each other in the mounting portion and at least one of which having an end portion formed in a hook shape to snap-fit with a pair of hooking recesses disposed in a rear side of the electronic device, and at least one reverse-insertion preventing protrusion extending upwardly in the mounting portion and to be received in a protrusion guiding hole defined in the rear side of the electrical device if the electronic device is correctly mounted.

BRIEF DESCRIPTION OF THE DRAWINGS

The above and other aspects, features and advantages of certain exemplary embodiments of the present disclosure will be more apparent from the following detailed description taken in conjunction with the accompanying drawings, in which.

DETAILED DESCRIPTION OF EXEMPLARY EMBODIMENTS

Figure 1:
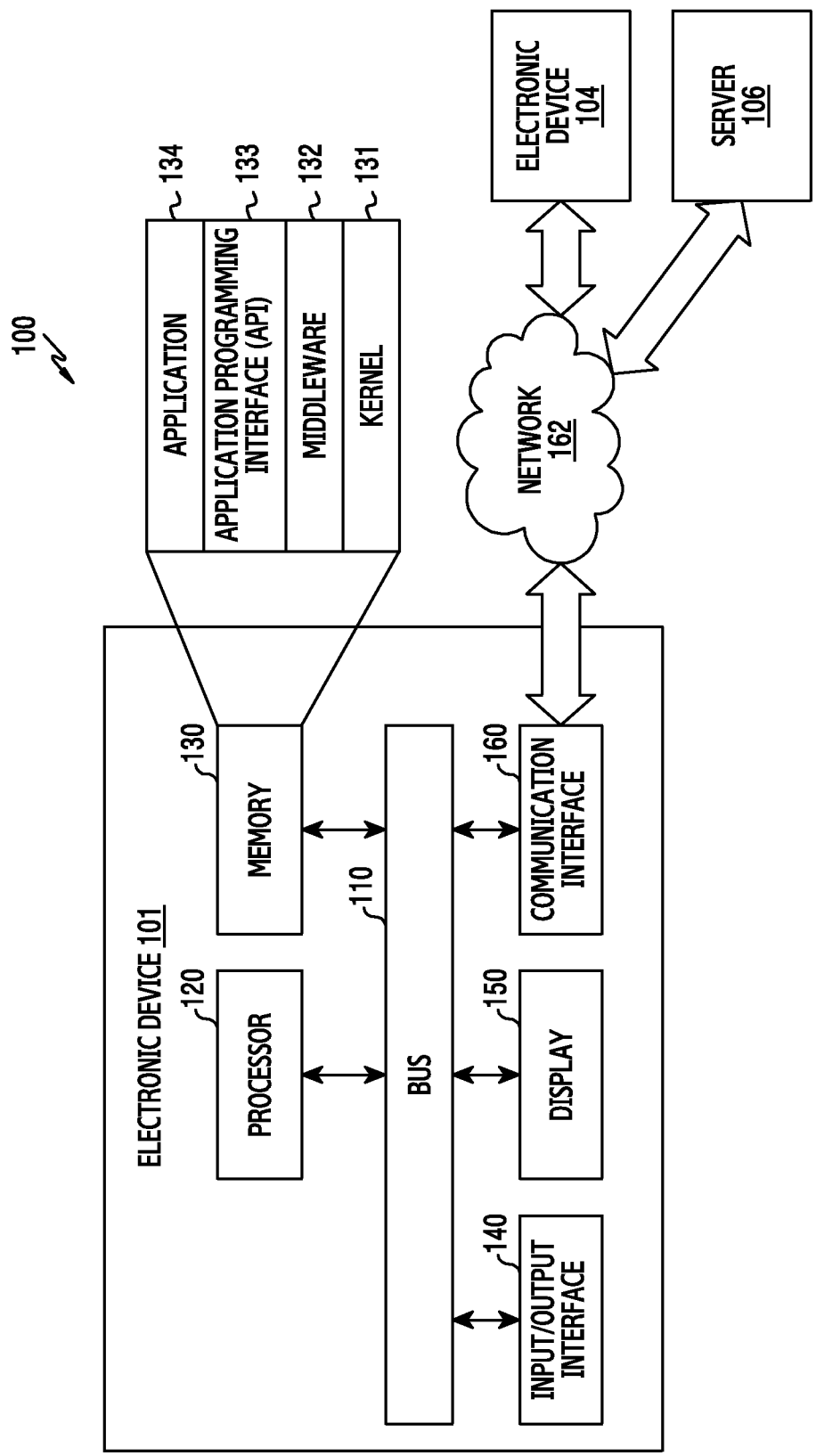
FIG. 1 illustrates a network environment including an electronic device applied to a cradle according to various exemplary embodiments of the present disclosure.

Hereinafter, various exemplary embodiments of the present disclosure are described with reference to the accompanying drawings. While the various exemplary embodiments of the present disclosure are susceptible to various modifications and alternative forms, a specific embodiment thereof has been shown by way of example in the drawings and will herein be described in detail. It should be understood, however, that it is not intended to limit the various exemplary embodiments of the present disclosure to the particular form disclosed, but, on the contrary, the various exemplary embodiments of the present disclosure are to cover all modifications, equivalent, and alternatives falling within the spirit and scope of the various exemplary embodiments of the present disclosure as defined by the appended claims. Like reference numerals denote like constitutional elements throughout the drawings.

The expression "include" or "may include" used in the various exemplary embodiments of the present disclosure is intended to indicate a presence of a corresponding function, operation, or constitutional element disclosed herein, and it is not intended to limit a presence of one or more functions, operations, or constitutional elements. In addition, in the various exemplary embodiments of the present disclosure, the term "include" or "have" is intended to indicate that characteristics, numbers, steps, operations, constitutional elements, and elements disclosed in the specification or combinations thereof exist. As such, the term "include" or "have" should be understood that there are additional possibilities of one or more other characteristics, numbers, steps, operations, constitutional elements, elements or combinations thereof.

In various exemplary embodiments of the present disclosure, an expression "or" includes any and all combinations of words enumerated together. For example, "A or B" may include A or B, or may include both of A and B.

Although expressions used in various exemplary embodiments of the present disclosure such as "$1^{st}$, $2^{nd}$", "first", "second" may be used to express various constitutional elements of the various exemplary embodiments, it is not intended to limit the corresponding constitutional elements. For example, the above expressions are not intended to limit an order or an importance of the corresponding constitutional elements. The above expressions may be used to distinguish one constitutional element from another constitutional element. For example, a $1^{st}$ user device and the $2^{nd}$ user device are both user devices, and indicate different user devices. For example, a 1st constitutional element may be termed a $2^{nd}$ constitutional element, and similarly, the $2^{nd}$ constitutional element may be termed the $1^{st}$ constitutional element without departing from the scope of the various exemplary embodiments of the present disclosure.

When a constitutional element is mentioned as being "connected" to or "accessing" another constitutional element, this may mean that it is directly connected to or accessing the other constitutional element, but it is to be understood that there are no intervening constitutional elements present. On the other hand, when a constitutional element is mentioned as being "directly connected" to or "directly accessing" another constitutional element, it is to be understood that there are no intervening constitutional elements present.

By the term "substantially" it is typically meant that the recited characteristic, parameter, or value need not be achieved exactly, but that deviations or variations, including but in no way limited to, for example, tolerances, measurement error, measurement accuracy limitations and other factors known to persons of ordinary skill in the art, may occur in amounts that do not preclude the effect the characteristic was intended to provide.

The terminology used in various exemplary embodiments of the present disclosure is for the purpose of describing particular exemplary embodiments only and is not intended to be limiting of the various exemplary embodiments of the present disclosure. A singular expression includes a plural expression unless there is a contextually distinctive difference therebetween.

Unless otherwise defined, all terms (including technical and scientific terms) used herein have the same meaning as commonly understood by those ordinarily skilled in the art to which various exemplary embodiments of the present disclosure belong. It will be further understood that terms, such as those defined in commonly used dictionaries, should be interpreted as having a meaning that is consistent with their meaning in the context of the relevant art and the various exemplary embodiments of the present disclosure, and will not be interpreted in an idealized or overly formal sense unless expressly so defined herein.

An electronic device according to various exemplary embodiments of the present disclosure may be a device including an antenna capable of performing a communication function in at least one frequency band. For example, the electronic device may be a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a mobile medical device, a camera, and a wearable device (e.g., a Head-Mounted-Device (HMD) such as electronic glasses, electronic clothes, an electronic bracelet, an electronic necklace, an electronic appcessory, an electronic tattoo, or a smart watch).

According to certain exemplary embodiments, the electronic device may be a smart home appliance having an antenna. For example, the smart home appliance may include at least one of a Television (TV), a Digital Video Disc (DVD) player, an audio, a refrigerator, an air conditioner, a cleaner, an oven, a microwave oven, a washing machine, an air purifier, a set-top box, a TV box (e.g., Samsung HomeSync™, Apple TV™, or Google TV™), a game console, an electronic dictionary, an electronic key, a camcorder, and an electronic picture frame.

According to certain exemplary embodiments, the electronic device including the antenna may be one of various medical devices (e.g., Magnetic Resonance Angiography (MRA), Magnetic Resonance Imaging (MRI), Computed Tomography (CT), imaging equipment, ultrasonic instrument, etc.), a navigation device, a Global Positioning System (GPS) receiver, an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, and Point Of Sales (POS) of shops.

According to certain exemplary embodiments, the electronic device may be part of at least one of an item of furniture or a building/structure including an antenna. The electronic device may be an electronic board, an electronic signature input device, a projector, or any of various measurement machines (e.g., water supply, electricity, gas, propagation measurement machine, etc.). The electronic device may be one or more combinations of the aforementioned various devices. In addition, the electronic device may be a flexible device. Moreover, the electronic device is not limited to the aforementioned devices.

Hereinafter, an electronic device according to various exemplary embodiments will be described with reference to the accompanying drawings. The term 'user' used in the various exemplary embodiments may refer to a person who uses the electronic device or a device which uses the electronic device (e.g., an Artificial Intelligence (AI) electronic device).

FIG. 1 illustrates a network environment 100 including an electronic device 101 according to various exemplary embodiments. The electronic device 101 may include a bus 110, a processor 120, a memory 130, an input/output interface 140, a display 150, and a communication interface 160.

The bus 110 may be a circuit for connecting the aforementioned constitutional elements to each other and for delivering communication (e.g., a control message) between the aforementioned constitutional elements.

The processor 120 may receive an instruction from the aforementioned different constitutional elements (e.g., the memory 130, the input/output interface 140, the display 150, the communication interface 160, etc.), for example, via the bus 110, and thus may interpret the received instruction and execute arithmetic or data processing according to the interpreted instruction.

The memory 130 may store an instruction or data received from the processor 120 or different constitutional elements (e.g., the input/output interface 140, the display 150, the communication interface 160, etc.) or generated by the processor 120 or the different constitutional elements. The memory 130 may include programming modules such as a kernel 131, a middleware 132, an Application Programming Interface (API) 133, an application 134, and the like. Each of the aforementioned programming modules may consist of software, firmware, or hardware entities or may consist of at least two or more combinations thereof.

The kernel 131 may control or manage the remaining other programming modules, for example, system resources (e.g., the bus 110, the processor 120, the memory 130, etc.) used to execute an operation or function implemented in the middleware 132, the API 133, or the application 134. In addition, the kernel 131 may provide a controllable or manageable interface by accessing individual constitutional elements of the electronic device 101 in the middleware 132, the API 133, or the application 134.

The middleware 132 may perform a mediation role so that the API 133 or the application 134 communicates with the kernel 131 to exchange data. In addition, regarding task requests received from the application 134, for example, the middleware 132 may perform a control (e.g., scheduling or load balancing) for the task requests by using a method of assigning a priority capable of using a system resource (e.g., the bus 110, the processor 120, the memory 130, etc.) of the electronic device 101 to at least one of the applications 134.

The API 133 may include at least one interface or function (e.g., instruction) for file control, window control, video processing, character control, and the like, as an interface capable of controlling a function provided by the application 134 in the kernel 131 or the middleware 132.

The application 134 may include an Short Message Service (SMS)/Multimedia Messaging Service (MMS) application, an e-mail application, a calendar application, an alarm application, a health care application (e.g., an application for measuring a physical activity level, a blood sugar, etc.) or an environment information application (e.g., atmospheric pressure, humidity, or temperature information). Additionally or alternatively, the application 134 may be an application related to an information exchange between the electronic device 101 and an external electronic device (e.g., an electronic device 104 or server 106). The application related to the information exchange may include, for example, a notification relay application for relaying specific information to the external electronic device or a device management application for managing the external electronic device.

For example, the notification relay application may include a function of relaying notification information generated in another application (e.g., an SMS/MMS application, an e-mail application, a health care application, an environment information application, etc.) of the electronic device 101 to the external electronic device (e.g., the electronice device 104 or the server 106). Additionally or alternatively, the notification relay application may receive notification information, for example, from the external electronic device (e.g., the electronice device 104 or the server 106) and may provide the notification information to the user. The device management application may manage, for example, a function for at least one part of the external electronic device which communicates with the electronic device 101. Examples of the function include turning on/turning off the external electronic device (or some components thereof) or adjusting of a display illumination (or a resolution), and managing (e.g., installing, deleting, or updating) an application which operates in the external electronic device or a service (e.g., a call service or a message service) provided by the external electronic device (e.g., the electronice device 104 or the server 106).

The application 134 may include an application specified according to attribute information (e.g., an electronic device type) of the external electronic device. For example, if the external electronic device is an MP3 player, the application 134 may include an application related to a music play. Similarly, if the external electronic device is a mobile medical device, the application 134 may include an application related to a health care. The application 134 may include at least one of a specified application in the electronic device 101 or an application received from the external electronic device.

The input/output interface 140 may relay an instruction or data input from a user by using a sensor (e.g., an acceleration sensor (not shown), a gyro sensor (not shown)) or an input device (e.g., a keyboard (not shown) or a touch screen (not shown)) to the processor 120, the memory 130, or the communication interface 160, for example, via the bus 110. For example, the input/output interface 140 may provide data regarding a user's touch input via the touch screen to the processor 120. In addition, the input/output interface 140 may output an instruction or data received from the processor 120, the memory 130, or the communication interface 160 to an output device (e.g., a speaker (not shown) or a display (not shown)), for example, via the bus 110. For example, the input/output interface 140 may output audio data provided by using the processor 120 to the user via the speaker.

The display 150 may display a variety of information (e.g., multimedia data or text data) to the user.

The communication interface 160 may provide a communication link, or establish a communication between the electronic device 101 and an external device (e.g., the electronic device 104 or the server 106). The communication interface 160 may include an antenna 230, examples of which are described hereinafter. For example, the communication interface 160 may communicate with the external device by being connected with a network 162 through wireless communication or wired communication. The wireless communication may include, for example, at least one of Wireless Fidelity (Wi-Fi), Bluetooth (BT), Near Field Communication (NFC), Global Positioning System (GPS), and cellular communication (e.g., long term evolution (LTE), long term evolution-advanced (LTE-A), Code Division Multiple Access (CDMA), Wideband Code Division Multiple Access (WCDMA), Universal Mobile Telecommunications Service (UMTS), Wireless BROadband (WiBro), Global System for Mobile communication (GSM), etc.). The wired communication may include, for example, at least one of Universal Serial Bus (USB), High Definition Multimedia Interface (HDMI), Recommended Standard (RS)-232, and Plain Old Telephone Service (POTS).

The network 162 may be a telecommunications network. The telecommunications network may include at least one of a computer network, an internet, an internet of things, and a telephone network. A protocol (e.g., a transport layer protocol, a data link layer protocol, or a physical layer protocol) for communication between the electronic device 101 and an external device (e.g., the electronic device 104 or the server 106) may be supported in at least one of the application 134, the application programming interface 133, the middleware 132, the kernel 131, and the communication interface 160.

Various exemplary embodiments of the present disclosure illustrate a wearable electronic device, and describe a cradle applied thereto, that is, a cradle used for charging the wearable electronic device and for transmitting/receiving data with respect to an external device (e.g., a Personal Computer (PC), etc.). However, the present disclosure is not limited thereto, and it is apparent that the cradle can be applied not only to the wearable electronic device but also to a typical portable electronic device (e.g., a smart phone, a Head Mounted Display (HMD), etc.) without departing from the scope of technical features of the present disclosure.

Figure 2A:
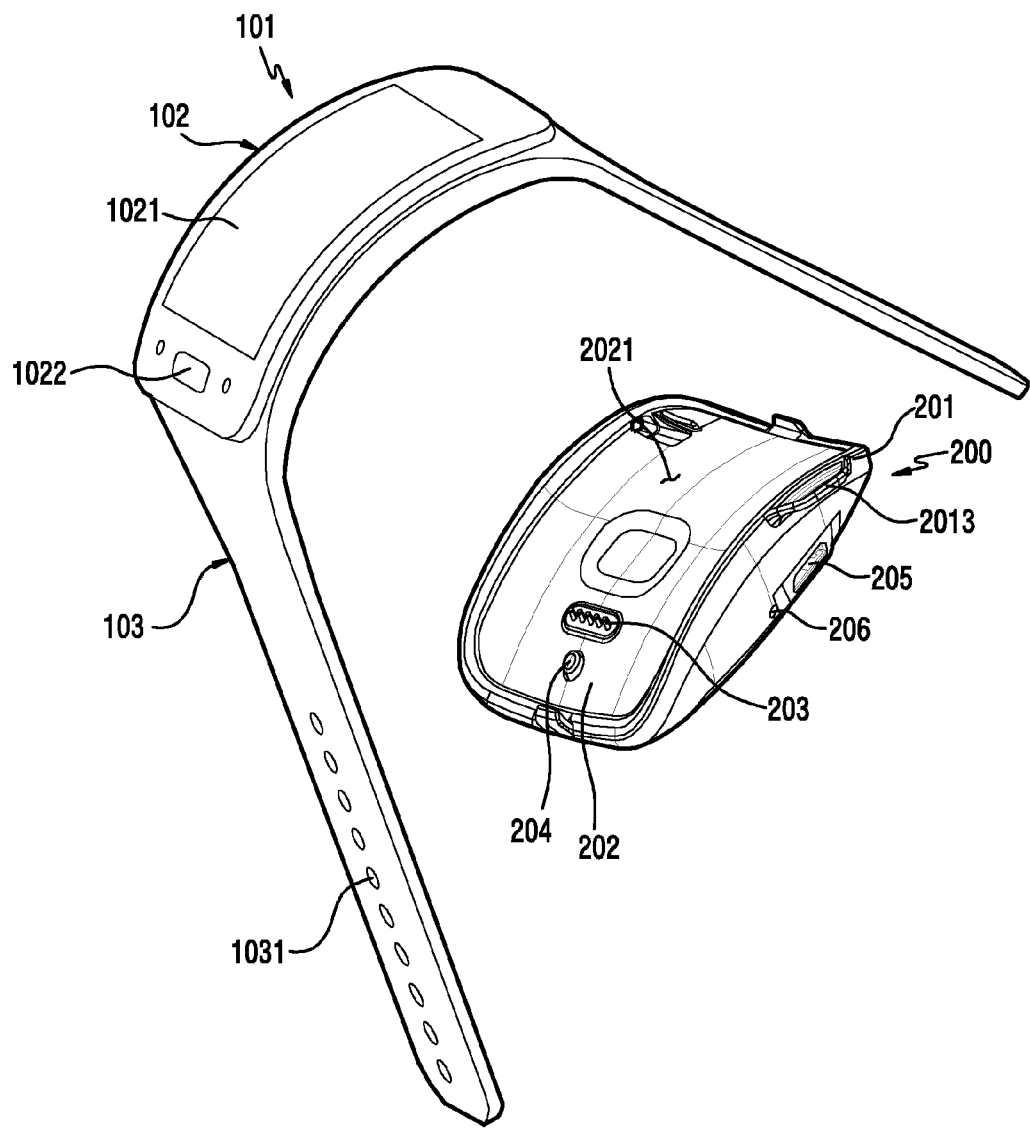
FIG. 2A and FIG. 2B are perspective views illustrating a state in which an electronic device is detached from a cradle and a state in which the electronic device is attached to the cradle according to various exemplary embodiments of the present disclosure.
Figure 2B:
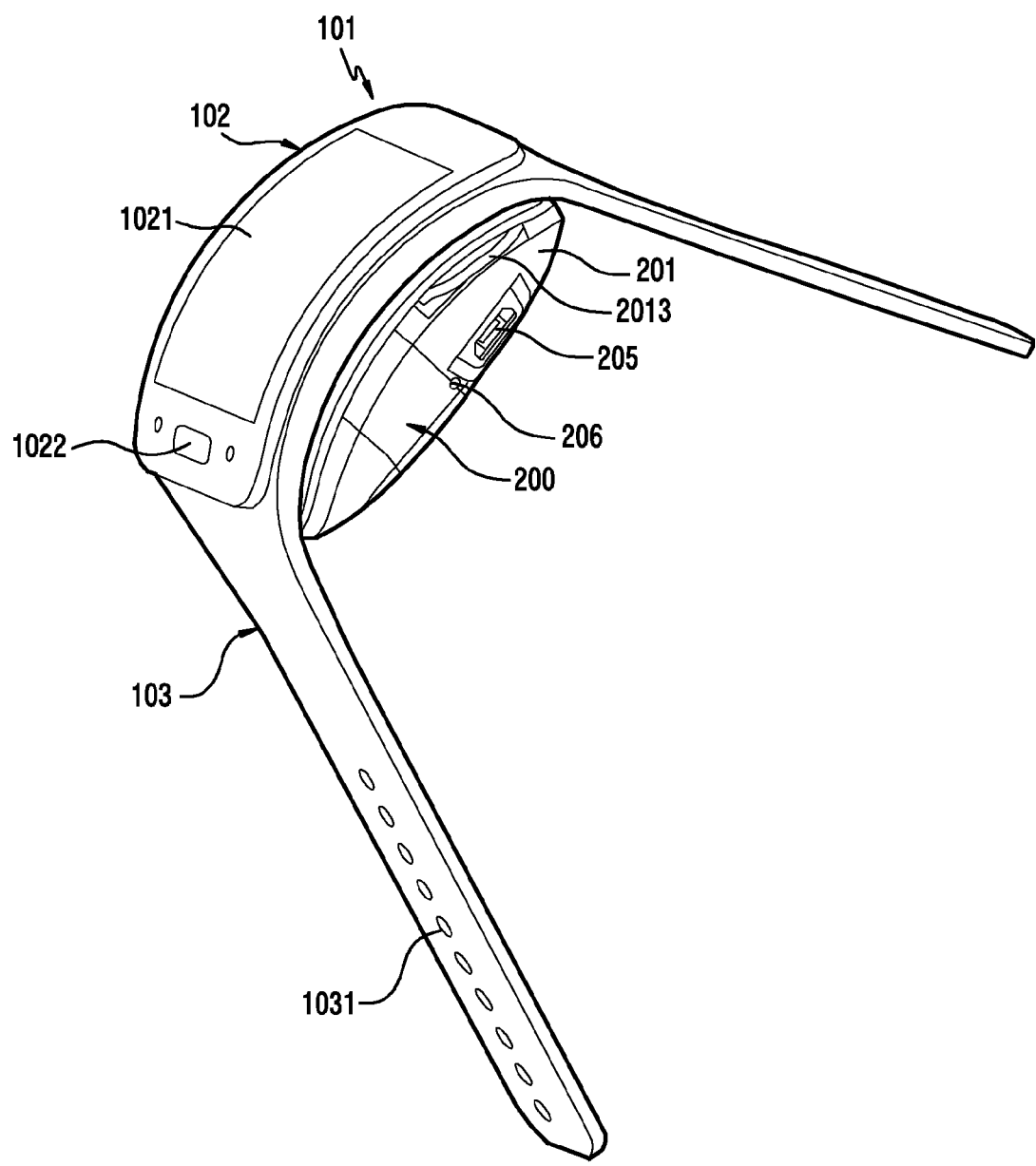

FIG. 2A and FIG. 2B are perspective views illustrating a state in which an electronic device 101 is detached from a cradle 200 or a state in which the electronic device 101 is attached to the cradle 200 according to various exemplary embodiments of the present disclosure.

Referring to FIG. 2A and FIG. 2B, the electronic device 101 is a wrist-wearable electronic device that can be worn on a wrist of a user. According to an exemplary embodiment, the electronic device 101 may include a main body 102 attached to a connection portion (e.g., a strap) 103. According to an exemplary embodiment, the electronic device 101 may be worn in such a manner that the connection portion 103 is wound around the wrist—a state in which the main body 102 is placed on the wrist. The connection portion 103 includes a plurality of wrist adjusting openings 1031 with a specific interval to adjust a wearing position to a user's wrist.

According to various exemplary embodiments, the electronic device 101 may include a display 1021 in the main body 102. The display 1021 may be a touch screen. According to an exemplary embodiment, at least one key button 1022 may be disposed on the main body 102. According to an exemplary embodiment, the electronic device 101 may include a battery (e.g., a charging battery, not shown) as a power supply. In some embodiments, the battery is automatically charged only when the electronic device 101 is docked in the cradle 200, detailed hereinafter.

According to various exemplary embodiments, the cradle 200 may be formed in a shape applicable to or formfittable the main body 102 of the electronic device 101. According to an exemplary embodiment, the cradle 200 may include a lower housing 201 and an upper housing 202. According to an exemplary embodiment, the lower housing 201 may be formed to be extended up to a lateral side, and the upper housing 202 may be disposed to an upper side of the lower housing 201 and thus may include a device mounting portion 2021 to attachably/detachably accommodate the electronic device 101. According to an exemplary embodiment, the lower housing 201 may have a handle 2013 protruding from a lateral side to assist detaching the electronic device 101 from the cradle 200.

According to various exemplary embodiments, a connector port 205 and a Light Emitting Diode (LED) indicator 206 may be disposed on a lateral side of the cradle 200. According to an exemplary embodiment, the connector port 205 may be a USB port for an electrical connection with an external power source (not shown). According to an exemplary embodiment, the connector port 205 may be a data transmission/reception connector port capable of allowing data transmission/reception between the electronic device 101 and an external device (e.g., a PC, etc.) through a connection with the external device. According to an exemplary embodiment, the connector port 205 may be a connector port for simultaneously performing a charging operation for charging the electronic device 101 and an operation for transmitting/receiving data with respect to the external device. According to an exemplary embodiment, the LED indicator 206 may be used as a notification means for notifying the charging operation to a user. According to an exemplary embodiment, the LED indicator 206 may indicate various states of the cradle 200, such as, for example, a charging state, a fully-charged state, a data transmission/reception state, etc., to the user by applying different LED colors.

According to various exemplary embodiments, a plurality of connector pins 203 may be disposed in the device mounting portion 2021 formed on the upper housing 202. When the electronic device 101 is attached to or docked in the cradle 200, the connector pins 203 may physically be connected to one or more terminals (e.g., terminals 1024 of FIG. 5) disposed in a rear side (e.g., side 1023 of FIG. 5) of the electronic device 101 to enter the cradle 200 into an electrically connected state. According to an exemplary embodiment, since the terminals 1024 of the electronic device 200 can be disposed exteriorly on the rear side 1203 of the electronic device 101, the connector pins 203 may be formed to protrude by a specific length upwardly from the device mounting portion 2021. According to an exemplary embodiment, the connector pins 203 may be a plurality of pogo pins. However, the present disclosure is not limited thereto, and thus other well-known protruding pins which can be physically in contact with the aforementioned terminals 1024 may be used.

According to various exemplary embodiments of the present disclosure, the cradle 200 is not electrically connected to the connector pins 203—a state in which the electronic device 101 is not attached or docked in the cradle 200, even if the cradle 200 is connected to an external power device or an external data transmission/reception device via the connector port 205. According to an exemplary embodiment, the cradle 200 is not electrically connected to the connector pins 203 even in a state in which a charging battery pack (e.g., battery 208 of FIG. 4) is charged inside the cradle 200. In this way, the cradle 200 may be prevented from self-discharging. According to an exemplary embodiment, the cradle 200 may electrically connect the electronic device 101 and an external device connected to the connector port 205 for charging and/or data transmission/reception only when the electronic device 101 is attached or docked in the cradle 200.

According to various exemplary embodiments, a detection button 204 may electrically connect the electronic device 101 and the external device while being pulled back or depressed, that is, only when the electronic device 101 is attached or docked in the device mounting portion 2021 of the cradle 200. According to an exemplary embodiment, for example, while in a state in which the detection button 204 is continuously depressed, that is when the electronic device 101 is attached to the cradle 200, the detection button 204 may electrically connect the external device and the electronic device 101. On the contrary, in a state in which the electronic device 101 is detached from the cradle 200, the detection button 204 may switch to an original state in which the detection button 204 is restored or bounced back to an original protruding position. According to an alternative exemplary embodiment, the cradle 200 may include an electrical sensor, in addition to, or in place of the detection button 204, to detect or determine whether an electronic device 101 is mounted on the device mounting portion 2021. According to an exemplary embodiment, the electrical sensor may include a photo sensor, a proximity sensor, or the like capable of electrically or optically detecting or sensing whether an electronic device 101 is mounted on the device mounting portion 2021 of the cradle 200.

According to various exemplary embodiments, the cradle 200 may perform a plurality of desired operation (e.g., a charging operation and/or a data transmission/reception operation) only when the electronic device 101 is mounted on the device mounting portion 2021. In this way, a self-discharge can be avoided, and thereby eventually being able to avoid an erroneous operation of the cradle 200.

Figure 3:
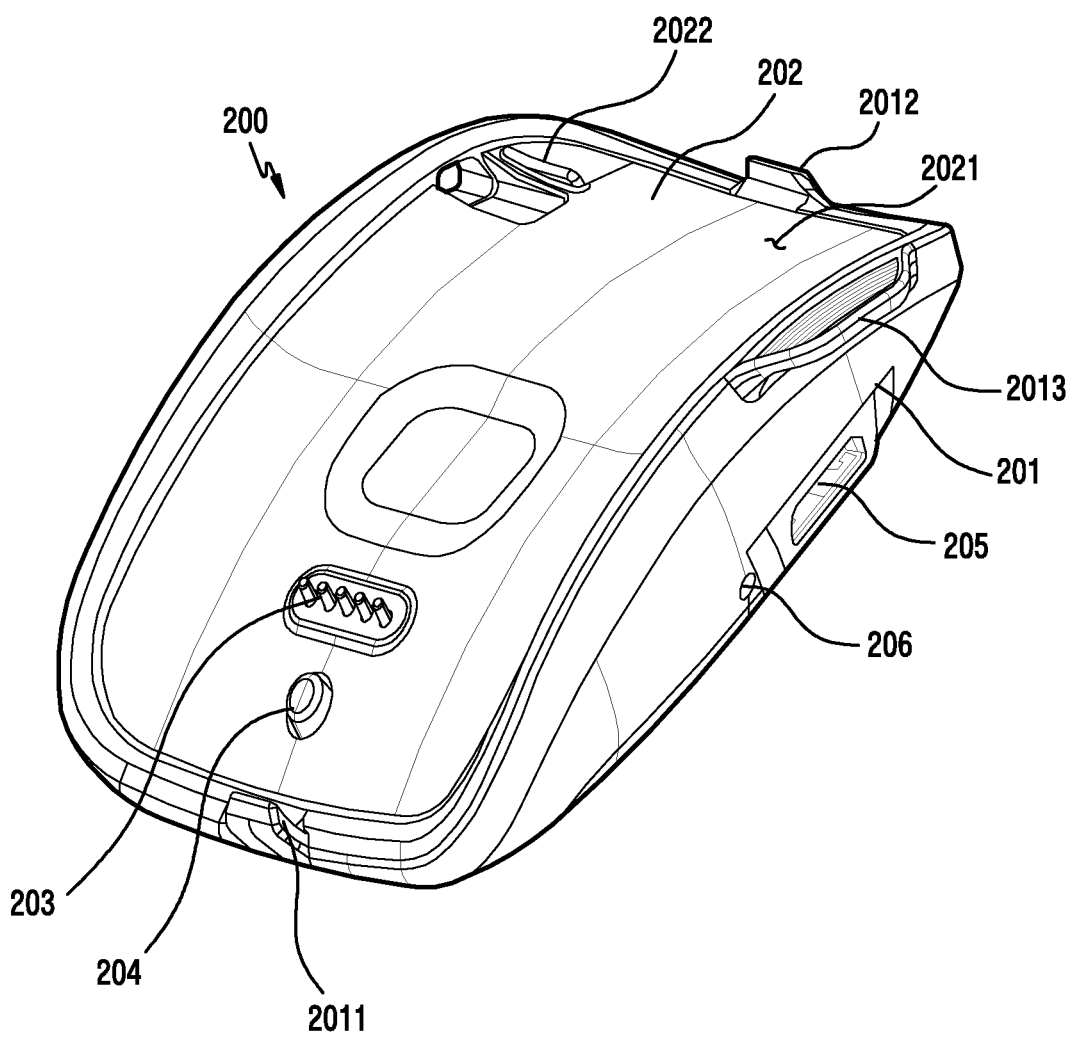
FIG. 3 is a perspective view illustrating an outer structure of a cradle according to various exemplary embodiments of the present disclosure.

FIG. 3 is a perspective view illustrating an outer structure of the cradle 200 according to various exemplary embodiments of the present disclosure.

Referring to FIG. 3, according to various exemplary embodiments, the cradle 200 may be formed with a size suitable for the main body 102 of the electronic device 101. According to an exemplary embodiment, the cradle 200 may include the lower housing 201 and the upper housing 202. According to an exemplary embodiment, the lower housing 201 may be formed to be extended up to a lateral side of the cradle 200. The upper housing 202 may be formed as the device mounting portion 2021 to detachably/attachably accommodate the electronic device 101, and may be disposed on an upper side of the lower housing 201. According to an exemplary embodiment, the device mounting portion 2021 may be formed in a shape corresponding to the rear side (e.g., side 1023 of FIG. 5) of the electronic device 101 and thus may be configured to be roughly in surface-contact therewith, when the electronic device 101 is mounted on the device mounting portion 2021.

According to various exemplary embodiments, the cradle 200 may include the connector port 205 and at least one LED indicator 206. According to an exemplary embodiment, the connector port 205 may be a USB port to electrically connect the cradle 200 with an external power source. According to an exemplary embodiment, the connector port 205 may be a data transmission/reception connector port to allow data transmission/reception between the electronic device 101 and an external device (e.g., a PC, etc.). According to an exemplary embodiment, the connector port 205 may simultaneously charge an attached/docked electronic device 101 and transmit/receive data with a connected external device. According to an exemplary embodiment, the LED indicator 206 may notify or indicate a charging operation or state of the cradle 200 to a user. According to an exemplary embodiment, the LED indicator 206 may notify or indicate various states of the electronic device 101, such as a charging state, a fully-charged state, a data transmission/reception state, etc., to the user by applying different LED colors.

According to various exemplary embodiments, the cradle 200 may include a pair of hooking pieces 2011 and 2012 for maintaining a state in which the electronic device 101 is mounted on the device mounting portion 2021. According to an exemplary embodiment, the pair of hooking pieces 2011 and 2012 may extend upwardly at positions facing each other in the lower housing 201, and may include a hook in an end portion thereof. According to an exemplary embodiment, the pair of hooking pieces 2011 and 2012 may be fixed, hooked, or received in a pair of hooking recesses (e.g., recesses 1025 and 1026 of FIG. 5) formed on the rear side 1023 of the electronic device 101. According to an exemplary embodiment, the pair of hooking pieces 2011 and 2012 may be snap-fit with the pair of hooking recesses 1025 and 1026.

According to various exemplary embodiments, the handle 2013 may be formed to be extended outwardly from the lower housing 201. Therefore, the electronic device 101 may easily detach the electronic device 101 from the cradle 200 by holding the handle 2013, that is, in a state in which the electronic device 101 is mounted on the cradle 200 via the pair of hooking pieces 2011 and 2012 and the pair of hooking recesses 1025 and 1026.

According to various exemplary embodiments, the cradle 200 may include a reverse-insertion preventing protrusion 2022 which protrudes upwardly by a specific length from the device mounting portion 2021 to provide a correct directional guide for mounting the electronic device 101 which may have a symmetric rear side 1023. According to an exemplary embodiment, if the electronic device 101 is correctly mounted, the reverse-insertion preventing protrusion 2022 may be inserted to a protrusion guiding hole (e.g., hole 1029 of FIG. 5) defined in the rear side 1023 of the electronic device 101. If the electronic device 101 is reverse-inserted to the cradle 200, a flat surface of the rear side 1023 of the electronic device 101 is in contact with the reverse-insertion preventing protrusion 2022. Therefore, the electronic device 101 cannot be completely mounted on the device mounting portion 2021 of the cradle 200, and thus is not electrically connected to the cradle 200.

According to an exemplary embodiment, the detection button 204 may be disposed on a line formed between the pair of hooking pieces 2011 and 2012 to easily detect whether the electronic device 101 is mounted. According to an exemplary embodiment, the detection button 204 may be disposed around the connector pins 203 on the device mounting portion 2021 to easily detect whether the electronic device 101 is mounted.

Figure 4:
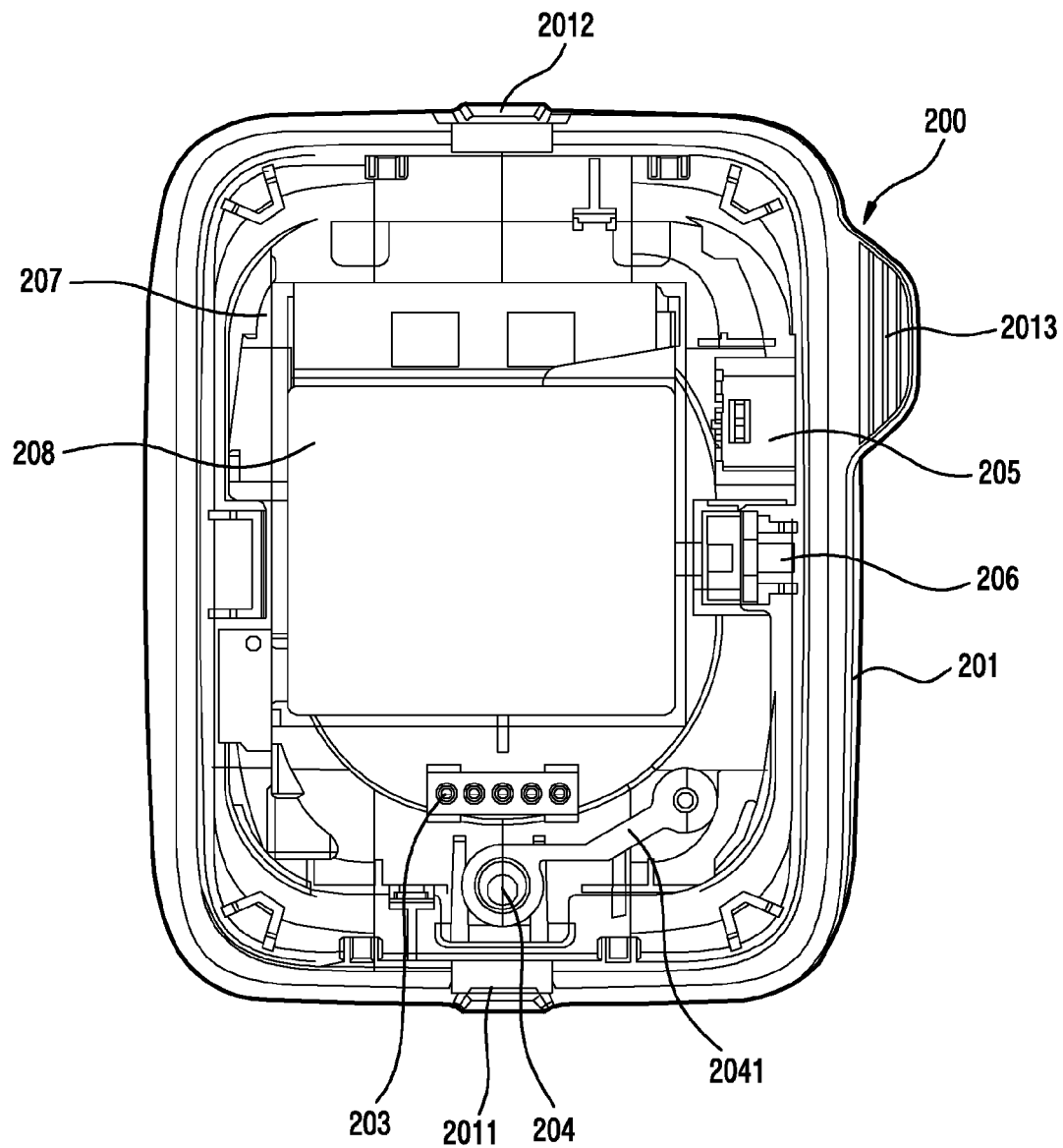
FIG. 4 illustrates an inner structure of a cradle according to various exemplary embodiments of the present disclosure.

FIG. 4 illustrates an inner structure of the cradle 200 according to various exemplary embodiments of the present disclosure.

Referring to FIG. 4, the cradle 200 may include a Printed Circuit Board (PCB) 207. According to an exemplary embodiment, the aforementioned connector port 205, connector pin 203, and detection button 204 may be mounted on the PCB 207. According to an exemplary embodiment, the connector port 205, the connecter pin 203, and the detection button 204 may be mounted on the PCB 207 in a surface mount device (SMD) manner. According to an exemplary embodiment, the detection button 204 may further include an elastic member to restore the detection button 204 back to an original protruding position when the electronic device 101 is detached from the cradle 200 after being pulled back by the electronic device 101. According to an exemplary embodiment, a leaf spring 2041 spaced apart by a specific interval from the detection button 204 may be used as the elastic member. However, the present disclosure is not limited thereto, and thus a coil-shape spring may be used, and self-restoring force caused by the elastic member equipped in the detection button itself may be used.

According to various exemplary embodiments, if the cradle 200 is used for the purpose of charging a relatively small-sized wearable electronic device which is to be worn on a wrist, a volume thereof is relatively small and slim and thus portability can be easily implemented. Therefore, the cradle 200 may be used as a portable charger (e.g., a power pack, or the like). In this case, an additional built-in charging battery pack 208 may be further included in the PCB 207. According to an exemplary embodiment, even if the cradle 200 is not electrically connected to the electronic device 101, the cradle 200 may charge the charging battery pack 208 by electrically connecting to an external power source via the connector port 205. In this case, if the charging battery pack 208 is currently being charged or is fully changed, state information may also be provided via the LED indicator 206. According to an exemplary embodiment, although not shown, the cradle 200 may include a speaker device, and may also audibly provide or indicate a corresponding notification to a user based on information of the charging battery pack 208. According to an exemplary embodiment, if the cradle 200 is carried on a pocket, bag, or the like of the user, the detection button 204 may be arbitrarily pressed, and at the same time, a conductive foreign substance may be physically in contact with the connector pin 203. In such as case, notification information indicating that the detection button 204 has been arbitrarily pressed may be provided to the user through an audio output using the speaker device. Of course, in case of such an operation, if the detection button 204 is pressed by the electronic device 101, the cradle 200 may be configured not to notify an alert to the speaker device by detecting that the connector pins 203 are connected to the terminals (terminals 1024 of FIG. 5) of the electronic device 101.

Figure 5:
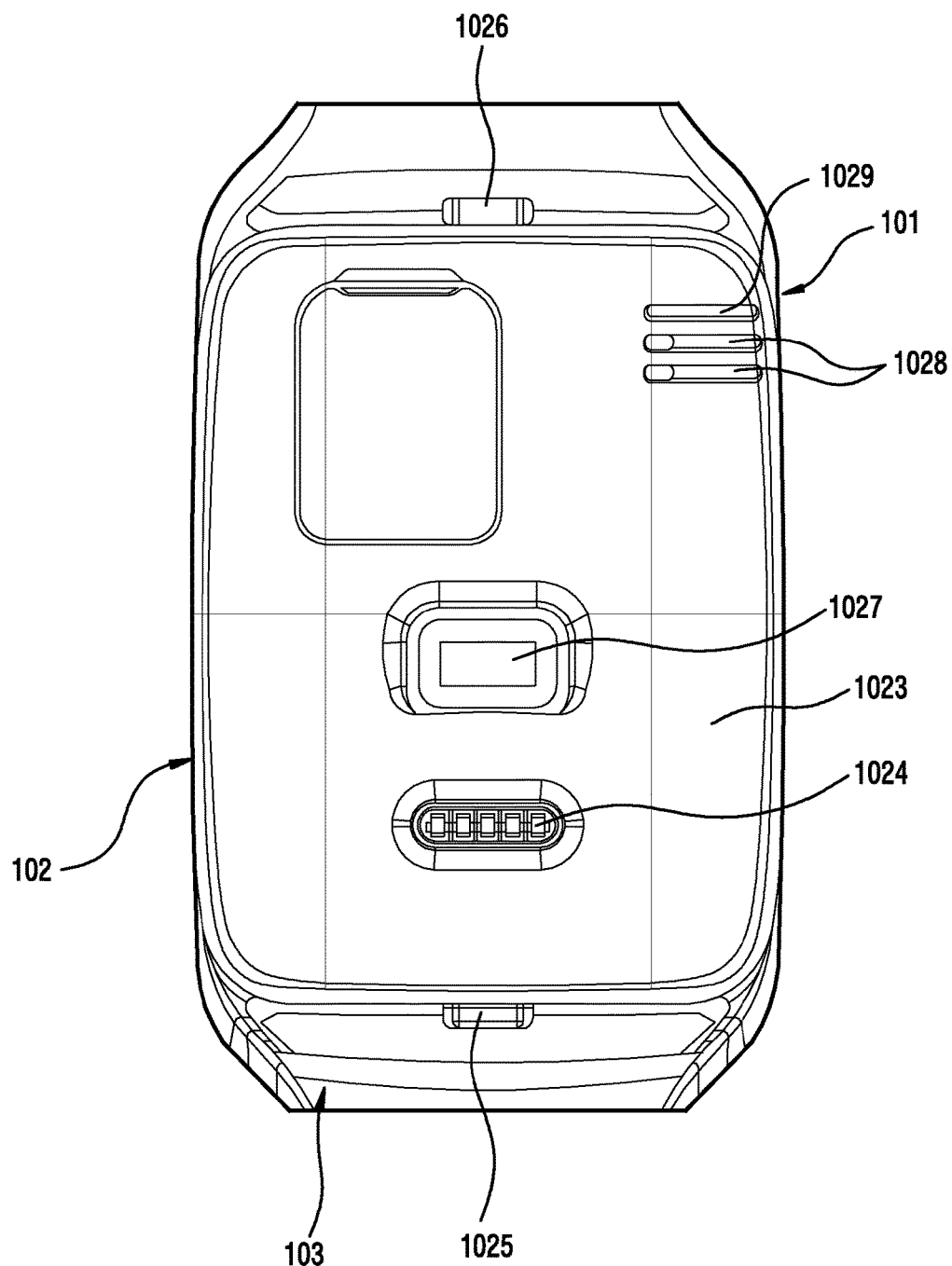
FIG. 5 illustrates a structure of a rear side of an electronic device according to various exemplary embodiments of the present disclosure.

FIG. 5 illustrates a structure of the rear side 1023 of the electronic device 101 according to various exemplary embodiments of the present disclosure. The configuration of FIG. 5 will be described with reference to FIG. 3 and FIG. 4 as well.

Referring to FIG. 5, the plurality of terminals 1024 for physically contacting the connector pins 203 of the cradle 200 may be included in the rear side 1023 of the electronic device 101. According to an exemplary embodiment, the terminals 1024 may be disposed flush with the rear side 1023 or in a recess formed on the rear side 1023 while being exposed in the rear side 1023 of the electronic device 101. According to an exemplary embodiment, a heartrate measuring sensor 1027 for a user's healthcare may be further included in the rear side 1023 of the electronic device 101 when worn on a user's wrist. According to an exemplary embodiment, a speaker hole 1028 may be disposed in the rear side 1023 of the electronic device 101 to generate speaker sound output through the speaker device included therein. According to an exemplary embodiment, although not shown, in a proper position of the electronic device 101, a microphone hole may be formed at a position corresponding to a microphone disposed inside the electronic device 101 to accommodate a user's voice.

According to various exemplary embodiments, the pair of hooking recesses 1025 and 1026 may be formed in the rear side 1023 of the electronic device 101. According to an exemplary embodiment, the pair of hooking recesses 1025 and 1026 may be disposed at positions facing each other in the main body 102 of the electronic device 101. According to an exemplary embodiment, if the main body 102 of the electronic device 101 is mounted on the device mounting portion 2021, the hooking piece 2011 of the cradle 200 may hook to or be received at the hooking recess 1025 of the electronic device 101, and the hooking piece 2012 of the cradle 200 may hook to or be received at the hooking recess 1026 of the electronic device 101. Although the electronic device 101 is attached to the cradle 200 via the pair of hooking pieces 2011 and 2012 and the pair of hooking recesses 1025 and 1026 in the present exemplary embodiment, the present disclosure is not limited thereto. For example, the cradle 200 may include one or more pairs of hooking pieces, while the read side 1023 may also include one or more corresponding pairs of hooking recesses.

According to various exemplary embodiments, the reverse-insertion preventing protrusion 2022 in the cradle 200 is used to guide or position the electronic device 101 to be attached to the cradle 200 in a correct direction. The protrusion guiding hole 1029 may be formed in the rear side 1023 of the electronic device 101 to accommodate the reverse-insertion preventing protrusion 2022. According to an exemplary embodiment, the protrusion guiding hole 1029 may be disposed near the speaker hole 1028 to provide a good outer appearance. According to an exemplary embodiment, the protrusion guiding hole 1029 may have the same shape as the speaker hole 1028.

Figure 6:
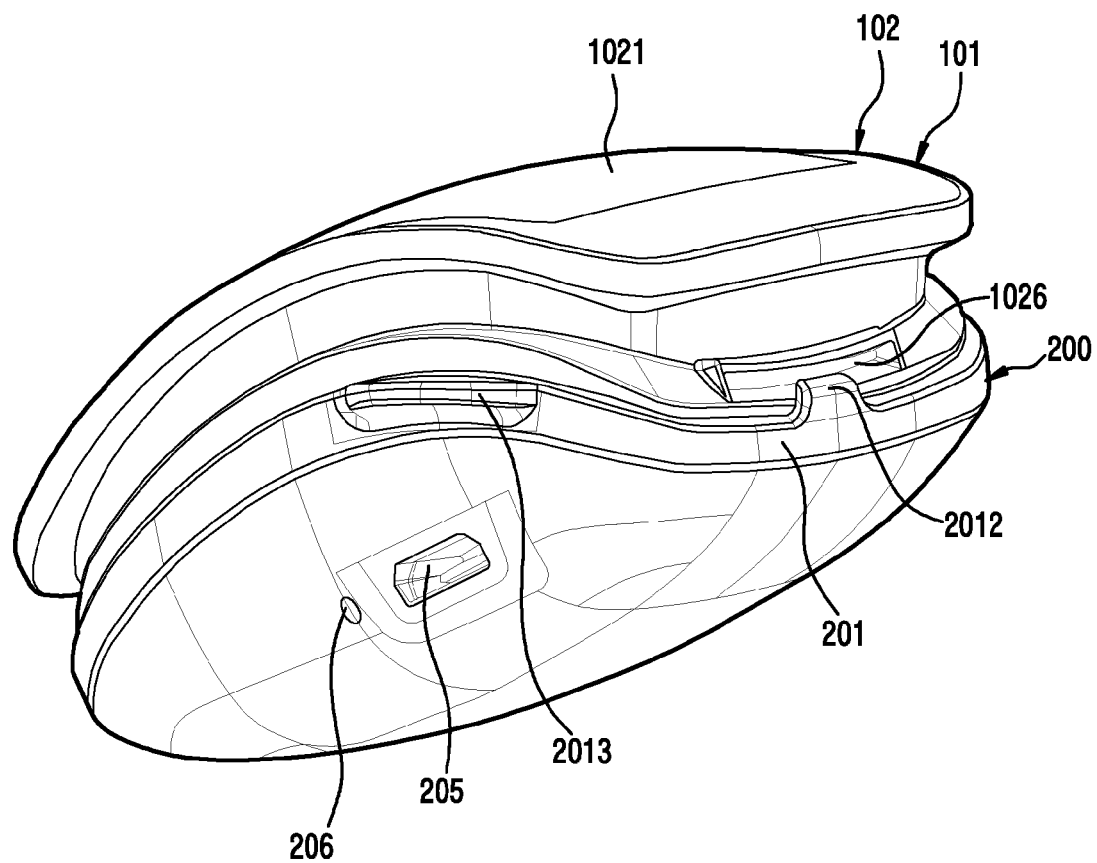
FIG. 6 is a perspective view illustrating parts of an electronic device in a state in which the electronic device is attached to a cradle according to various exemplary embodiments of the present disclosure.
Figure 7:
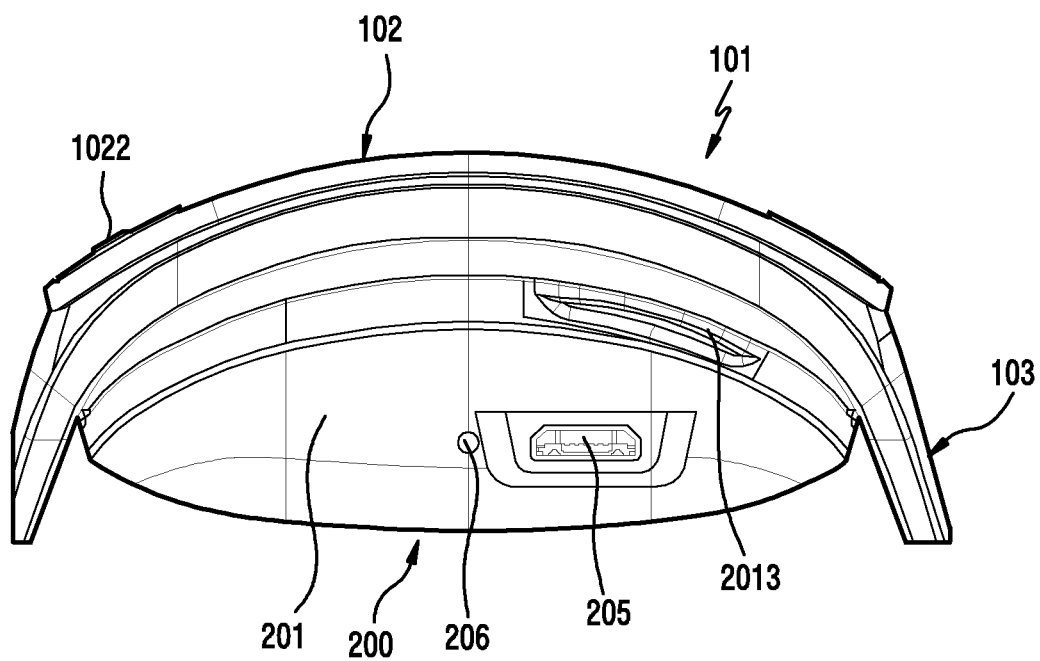
FIG. 7 is a lateral view illustrating parts of an electronic device in a state in which the electronic device is attached to a cradle according to various exemplary embodiments of the present disclosure.

FIG. 6 is a perspective view illustrating parts of a state in which the electronic device 101 is attached to the cradle 200 according to various exemplary embodiments of the present disclosure. FIG. 7 is a lateral view illustrating parts of a state in which the electronic device 101 is attached to the cradle 200 according to various exemplary embodiments of the present disclosure.

Referring to FIG. 6 and FIG. 7, when the electronic device 101 is attached to the cradle 200, the hooking piece 2012 of the cradle 200 may snap-fit with the hooking recess 1026 formed in the rear side 1023 of the electronic device 101. At the same time, although not shown, the hooking piece 2011 formed in an opposite direction of the cradle 200 may also snap-fit with the hooking recess 1025 disposed at a corresponding position of the rear side 1023 of the electronic device 101.

According to various exemplary embodiments, a position at which the pair of hooking pieces 2011 and 2012 and the pair of hooking recesses 1025 and 1026 are combined between the cradle 200 and the electronic device 101 is not disposed bilaterally symmetrical but disposed on a line extended from the connection portion 103. Therefore, as shown in FIG. 7, the hooking recesses 1025 and 1026 in the left and right sides of the electronic device 101 may be optional so as to provide a good outer appearance of the electronic device 101.

According to various exemplary embodiments, while holding the protruded handle 2013 in one side of the cradle 200, a user may pull the electronic device 101 upwardly to detach the pair of hooking pieces 2011 and 2012 from the pair of hooking recesses 1025 and 1026. At the same time, the detection button 204 of the cradle 200 may be restored to the original protruding state (e.g., a state of protruding in the device mounting portion 2021 of the cradle 200). Therefore, the charging battery pack 208 inside the cradle 200 may be electrically disconnected from the connector pin 203. In such a case, an electrical connection with an external device connected to the connector port 205 to transmit/receive data may also be isolated or disconnected.

According to various exemplary embodiments of the present disclosure, only during an electronic device 101 is attached to a cradle 200 that the cradle 200 may charge a battery or to establish an electrical connection automatically with an external device to transmit/receive data. Therefore, a Product Liability (PL) accident can be prevented, and reliability of the cradle can be improved.

Figure 8:
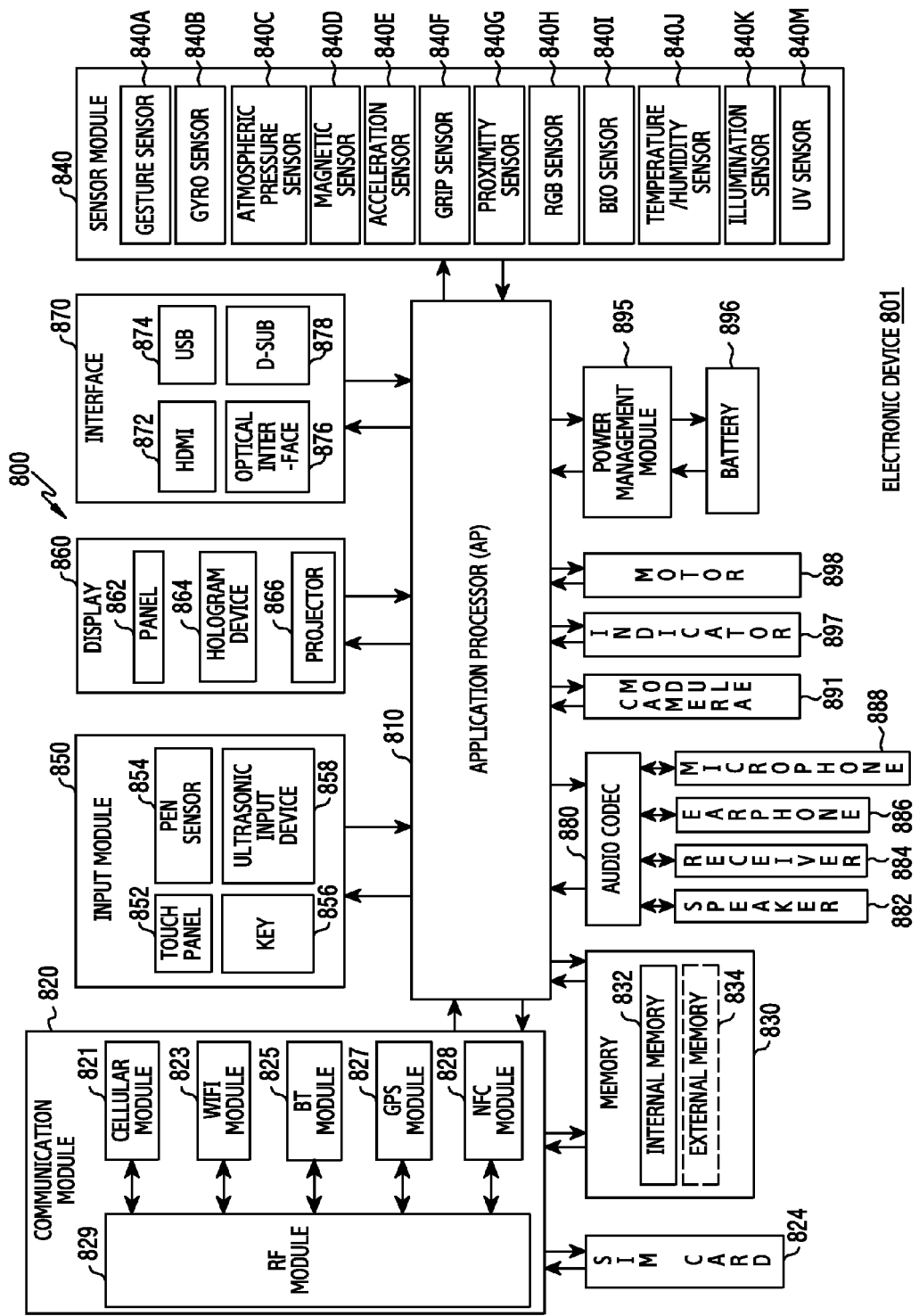
FIG. 8 is a block diagram of an electronic device applied to a cradle according to various exemplary embodiments of the present disclosure.

FIG. 8 illustrates a block diagram 800 of an electronic device 801 according to various exemplary embodiments of the present disclosure. As shown in FIG. 8, the electronic device 801 may entirely or partially constitute, for example, the electronic device 101 of FIG. 1, the device 300 of FIG. 2B. Electronic device 801 includes at least one Application Processor (AP) 810, a communication module 820, a Subscriber Identification Module (SIM) card 824, a memory 830, a sensor module 840, an input unit 850, a display 860, an interface 870, an audio module 880, a camera module 891, a power management module 895, a battery 896, an indicator 897, and a motor 898.

The AP 810 may control a plurality of hardware or software constitutional elements connected to the AP 810 by driving an operating system or an application program, and may process a variety of data including multimedia data and may perform an arithmetic operation. The AP 810 may be implemented, for example, with a System on Chip (SoC). The AP 810 may further include a Graphic Processing Unit (GPU, not shown).

The communication module 820 (e.g., the communication interface 160 of FIG. 1) may perform data transmission/reception in communication between other electronic devices (e.g., the electronic device 104 or the server 106) connected with the electronic device 801 (e.g., the electronic device 101) through a network. The communication module 820 may include a cellular module 821, a Wi-Fi module 823, a Bluetooth (BT) module 825, a Global Positioning System (GPS) module 827, a Near Field Communication (NFC) module 828, and a Radio Frequency (RF) module 829.

The cellular module 821 may provide a voice call, a video call, a text service, an internet service, and the like through a communication network (e.g., LTE, LTE-A, CDMA, WCDMA, UMTS, WiBro, GSM, etc.). In addition, the cellular module 821 may identify and authenticate the electronic device within the communication network by using a subscriber identity module (e.g., the SIM card 824), the cellular module 821 may perform at least some of functions that can be provided by the AP 810. For example, the cellular module 821 may perform at least some of multimedia control functions.

The cellular module 821 may include a Communication Processor (CP). Further, the cellular module 821 may be implemented, for example, with an SoC. Although constitutional elements such as the cellular module 821 (e.g., the communication processor), the memory 830, the power management module 895, and the like are illustrated as separate constitutional elements with respect to the AP 810 in FIG. 8, the AP 810 may also be implemented such that at least one part (e.g., the cellular module 821) of the aforementioned constitutional elements is included.

The AP 810 or the cellular module 821 (e.g., the communication processor) may load an instruction or data, which is received from each non-volatile memory connected thereto or at least one of different constitutional elements, to a volatile memory and may process the instruction or data. In addition, the AP 810 or the cellular module 821 may store data, which is received from at least one of different constitutional elements or generated by at least one of different constitutional elements, into the non-volatile memory.

Each of the WiFi module 823, the BT module 825, the GPS module 827, and the NFC module 828 may include, for example, a processor for processing data transmitted/received through a corresponding module. Although the cellular module 821, the WiFi module 823, the BT module 825, the GPS module 827, and the NFC module 828 are illustrated in FIG. 8 as separate blocks, according to one exemplary embodiment, at least some (e.g., two or more) of the cellular module 821, the WiFi module 823, the BT module 825, the GPS module 827, and the NFC module 828 may be included in one Integrated Chip (IC) or IC package. For example, at least some of processors corresponding to the cellular module 821, the WiFi module 823, the BT module 825, the GPS module 827, and the NFC module 828 (e.g., a communication processor corresponding to the cellular module 821 and a WiFi processor corresponding to the WiFi module 823) may be implemented with an SoC.

The RF module 829 may serve to transmit/receive data, for example, to transmit/receive an RF signal. Although not shown, the RF module 829 may include, for example, a transceiver, a Power Amp Module (PAM), a frequency filter, a Low Noise Amplifier (LNA), and the like. In addition, the RF module 829 may further include a component for transmitting/receiving a radio wave on a free space in wireless communication, for example, a conductor, a conducting wire, and the like. Although it is illustrated in FIG. 8 that the cellular module 821, the WiFi module 823, the BT module 825, the GPS module 827, and the NFC module 828 share one RF module 829, according to one exemplary embodiment, at least one of the cellular module 821, the WiFi module 823, the BT module 825, the GPS module 827, the NFC module 828 may transmit/receive an RF signal via a separate RF module.

The SIM card 824 may be a card in which a SIM is implemented, and may be inserted to a slot formed at a specific location of the electronic device. The SIM card 824 may include unique identification information (e.g., an Integrated Circuit Card IDentifier (ICCID)) or subscriber information (e.g., an International Mobile Subscriber Identity (IMSI)).

The memory 830 (e.g., the memory 130) may include an internal memory 832 or an external memory 834. The internal memory 832 may include, for example, at least one of a volatile memory (e.g., a Dynamic RAM (DRAM), a Static RAM (SRAM), a Synchronous Dynamic RAM (SDRAM), etc.) or a non-volatile memory (e.g., a One Time Programmable ROM (OTPROM), a Programmable ROM (PROM), an Erasable and Programmable ROM (EPROM), an Electrically Erasable and Programmable ROM (EEPROM), a Mask ROM, a Flash ROM, a NOT AND (NAND) flash memory, a NOT OR (NOR) flash memory, etc.).

The internal memory 832 may be a Solid State Drive (SSD). The external memory 834 may further include a flash drive, and may further include, for example, Compact Flash (CF), Secure Digital (SD), Micro Secure Digital (Micro-SD), Mini Secure digital (Mini-SD), extreme Digital (xD), memory stick, and the like. The external memory 834 may be operatively coupled to the electronic device 801 via various interfaces. The electronic device 801 may further include a storage unit (or a storage medium) such as a hard drive.

The sensor module 840 may measure a physical quantity or detect an operation state of the electronic device 801, and thus may convert the measured or detected information into an electric signal. The sensor module 840 may include, for example, at least one of a gesture sensor 840A, a gyro sensor 840B, a pressure sensor 840C, a magnetic sensor 840D, an acceleration sensor 840E, a grip sensor 840F, a proximity sensor 840G, a color sensor 840H (e.g., a Red, Green, Blue (RGB) sensor), a bio sensor 840I, a temperature/humidity sensor 840J, an illumination sensor 840K, and an Ultra Violet (UV) sensor 840M. Additionally or alternatively, the sensor module 840 may include, for example, an E-node sensor (not shown), an ElectroMyoGraphy (EMG) sensor (not shown), an ElectroEncephaloGram (EEG) sensor (not shown), an ElectroCardioGram (ECG) sensor (not shown), a fingerprint sensor, etc. The sensor module 840 may further include a control circuit for controlling at least one or more sensors included therein.

The input module 850 may include a touch panel 852, a (digital) pen sensor 854, a key 856, or an ultrasonic input unit 858. The touch panel 852 may recognize a touch input, for example, by using at least one of an electrostatic type, a pressure-sensitive type, and an ultrasonic type. The touch panel 852 may further include a control circuit. In case of the electrostatic type, not only a physical contact but also a proximity recognition is also possible. The touch penal 852 may further include a tactile layer. In this case, the touch panel 852 may provide the user with a tactile reaction.

The (digital) pen sensor 854 may be implemented, for example, by using the same or similar method of receiving a touch input of the user or by using an additional sheet for recognition. The key 856 may be, for example, a physical button, an optical key, a keypad, or a touch key. The ultrasonic input unit 858 is a device by which the electronic device 801 detects a sound wave through a microphone (e.g., a microphone 888) by using a pen which generates an ultrasonic signal, and is a device capable of radio recognition. The electronic device 801 may use the communication module 820 to receive a user input from an external device (e.g., a computer or a server) connected thereto.

The display 860 (e.g., the display 150) may include a panel 862, a hologram 864, or a projector 866. The panel 862 may be, for example, a Liquid-Crystal Display (LCD), an Active-Matrix Organic Light-Emitting Diode (AM-OLED), etc. The panel 862 may be implemented, for example, in a flexible, transparent, or wearable manner. The panel 862 may be constructed as one module with the touch panel 852. The hologram 864 may use an interference of light and show a stereoscopic image in the air. The projector 866 may display an image by projecting a light beam onto a screen. The screen may be located, for example, inside or outside the electronic device 801. The display 860 may further include a control circuit for controlling the panel 862, the hologram 864, or the projector 866.

The interface 870 may include, for example, a High-Definition Multimedia Interface (HDMI) 872, a Universal Serial Bus (USB) 874, an optical communication interface 876, or a D-subminiature (D-sub) 878. The interface 870 may be included, for example, in the communication interface 160 of FIG. 1. Additionally or alternatively, the interface 870 may include, for example, Mobile High-definition Link (MHL) (not shown), Secure Digital (SD)/Multi-Media Card (MMC) (not shown) or Infrared Data Association (IrDA) (not shown).

The audio module 880 may bilaterally convert a sound and electric signal. At least some constitutional elements of the audio module 808 may be included in, for example, the input/output interface 140 of FIG. 1. The audio module 880 may convert sound information which is input or output, for example, through a speaker 882, a receiver 884, an earphone 886, the microphone 888, and the like.

The camera module 891 is a device for image and video capturing, and according to one exemplary embodiment, may include one or more image sensors (e.g., a front sensor or a rear sensor), a lens (not shown), an Image Signal Processor (ISP) (not shown), or a flash (not shown, e.g., LED or xenon lamp).

The power management module 895 may manage power of the electronic device 801. Although not shown, the power management module 895 may include, for example, a Power Management Integrated Circuit (PMIC), a charger Integrated Circuit (IC), or a battery fuel gauge.

The PMIC may be placed, for example, inside an IC or SoC semiconductor. Charging may be classified into wired charging and wireless charging. The charger IC may charge a battery, and may avoid an over-voltage or over-current flow from a charger. The charger IC may further include a charger IC for at least one of the wired charging and the wireless charging. The wireless charging may be classified, for example, into a magnetic resonance type, a magnetic induction type, and an electromagnetic type. An additional circuit for the wireless charging, for example, a coil loop, a resonant circuit, a rectifier, and the like, may be added.

The battery gauge may measure, for example, a residual quantity of the battery 896 and a voltage, current, and temperature during charging. The battery 896 may store or generate electricity, and may supply power to the electronic device 801 by using the stored or generated electricity. For example, the battery 896 may include a rechargeable battery or a solar battery.

The indicator 897 may indicate a specific state, for example, a booting state, a message state, a charging state, and the like, of the electronic device 801 or a part thereof (e.g., the AP 810). The motor 898 may convert an electric signal into a mechanical vibration. Although not shown, the electronic device 801 may include a processing unit (e.g., a GPU) for supporting mobile TV. The processing unit for supporting mobile TV may process media data according to a protocol of, for example, Digital Multimedia Broadcasting (DMB), Digital Video Broadcasting (DVB), media flow, and the like.

Each of the aforementioned constitutional elements of the electronic device according to various exemplary embodiments of the present disclosure may consist of one or more components, and names thereof may vary depending on a type of electronic device. The electronic device according to various exemplary embodiments of the present disclosure may include at least one of the aforementioned constitutional elements. Some of the constitutional elements may be omitted, or additional other constitutional elements may be further included. In addition, some of the constitutional elements of the electronic device according to various exemplary embodiments of the present disclosure may be combined and constructed as one entity, so as to equally perform functions of corresponding constitutional elements before combination.

A term "module" used in various exemplary embodiments of the present document may imply a unit including, for example, one of hardware, software, and firmware or a combination of two or more of them. The "module" may be interchangeably used with a term such as a unit, a logic, a logical block, a component, a circuit, and the like. The "module" may be a minimum unit of an integrally constituted component or may be a part thereof. The "module" may be a minimum unit for performing one or more functions or may be a part thereof. The "module" may be mechanically or electrically implemented. For example, the "module" of the present disclosure may include at least one of an Application-Specific Integrated Circuit (ASIC) chip, a Field-Programmable Gate Arrays (FPGAs), and a programmable-logic device, which are known or will be developed and which perform certain operations.

According to various exemplary embodiments, at least some parts of a device (e.g., modules or functions thereof) or method (e.g., operations) according to various exemplary embodiments of the present disclosure may be implemented with an instruction stored in a computer-readable storage media for example. If the instruction is executed by one or more processors (e.g., the processor 810), the one or more processors may perform a function corresponding to the instruction. The computer-readable storage media may be, for example, the memory 830. At least some parts of the programming module may be implemented (e.g., executed), for example, by the processor 810. At least some parts of the programming module may include modules, programs, routines, sets of instructions, processes, and the like, for performing one or more functions.

The computer readable recording medium may be a hardware device configured particularly to store and perform a program instruction (e.g., program module), for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), a flash memory, and the like. An example of the program instruction includes not only a machine language created by a compiler but also a high-level language executable by a computer by using an interpreter or the like. The aforementioned hardware device may be configured to operate as one or more software modules to perform the operation of the present disclosure, and the other way around is also possible.

The module or programming module according to various exemplary embodiments of the present disclosure may further include at least one or more constitutional elements among the aforementioned constitutional elements, or may omit some of them, or may further include additional other constitutional elements. Operations performed by a module, programming module, or other constitutional elements according to various exemplary embodiments of the present disclosure may be executed in a sequential, parallel, repetitive, or heuristic manner. In addition, some of the operations may be executed in a different order or may be omitted, or other operations may be added.

While the present disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the present disclosure is defined not by the detailed description of the present disclosure but by the appended claims, and all differences within the scope will be construed as being included in the present disclosure.

What is claimed is:

1. A cradle for an electronic device, the cradle comprising:
    a mounting portion configured to detachably accommodate at least a part of the electronic device;
    a connector disposed in the mounting portion;
    a power source electrically connected to the connector;
    a detection member disposed on the mounting portion, and configured to detect whether the electronic device is mounted on the mounting portion; and
    a locking member configured to maintain a state in which the electronic device is mounted on the mounting portion and including a pair of hooking pieces which are extended upwardly and face each other,
    wherein each of the hooking pieces includes a hook disposed at an end portion of the each of the hooking pieces, and the hooking pieces are respectively disposed at an edge along an outer perimeter of the mounting portion,
    wherein the electronic device is configured to snap-fit the mounting portion by receiving the hooking pieces at a pair of hooking recesses disposed at a rear side of the electronic device,
    wherein the detection member is disposed between the pair of hooking pieces on the mounting portion and disposed around the connector to easily detect whether the electronic device is mounted,
    wherein the connector, the detection member, and the pair of hooking pieces are disposed on a center axis in a longitudinal direction of the mounting portion and the electronic device, and
    wherein the detection member is configured to establish an electrical connection between the power source and the connector only when the electronic device is completely mounted on the mounting portion.

2. The cradle of claim 1, wherein the power source is at least one of a charging battery pack embedded in the cradle, an external power source connected through a connector port on the cradle, or an external device connected to the connector port to transmit/receive data.

3. The cradle of claim 1, wherein the connector is a protruding connector disposed to be exposed at least in the mounting portion.

4. The cradle of claim 1,
    wherein the detection member comprises a detection button protruding from the mounting portion, and
    wherein the detection button is configured to maintain a state of being pulled back while the electronic device is mounted on the mounting portion.

5. The cradle of claim 1,
    wherein the connector protrudes upwardly from the mounting portion, and
    wherein the connector is configured to physically contact a terminal exposed in the rear side of the electronic device when the electronic device is mounted on the mounting portion.

6. The cradle of claim 1, wherein the electronic device is a wearable electronic device comprising a main body and a connection portion, the pair of hooking recesses being disposed on a line extended from the connection portion of the main body of the wearable electronic device.

7. The cradle of claim 1, wherein the cradle comprises at least one connector port configured to:
    charge a charging battery pack embedded in the cradle to supply power to the electronic device,
    charge a battery pack included inside the electronic device, or
    be electrically connected to an external device for charging and/or data transmission/reception of the electronic device.

8. The cradle of claim 1, wherein the electronic device is a wrist mounted device which excludes a physical keyboard.

9. The cradle of claim 1, wherein the detection member includes a sensor configured to detect whether the electronic device is mounted on the mounting portion.

10. The cradle of claim 9, wherein the sensor includes at least one of a proximity sensor or a pressure sensor.

11. The cradle of claim 1, further comprising at least one notification member configured to provide notification information comprising at least one of charging state information of the electronic device, charging state information of a charging battery pack included in the cradle, or connection information with respect to an external device.

12. The cradle of claim 11, wherein the at least one notification member includes at least one of:
- a Light Emitting Diode (LED) disposed in the cradle, at least a part of the LED being visible on the cradle, and configured to visually provide the notification information, or
- a speaker device configured to audibly provide the notification information.

13. The cradle of claim 1, wherein the mounting portion further comprises at least one reverse-insertion preventing protrusion extending upwardly to prevent the electronic device from being reversely inserted.

14. The cradle of claim 13, wherein the reverse-insertion preventing protrusion is received at a protrusion guiding hole defined in the rear side of the electronic device if the electronic device is correctly mounted on the mounting portion.

15. The cradle of claim 14, wherein the protrusion guiding hole is defined near at least one speaker hole also defined in the rear side of the electronic device.

\* \* \* \* \*